United States Patent [19]

Condon

[11] Patent Number: 5,577,530

[45] Date of Patent: Nov. 26, 1996

[54] PARTIALLY RECESSED VALVE FIXTURE FOR CONNECTION TO FAUCETS AND COMMODES

[76] Inventor: Duane R. Condon, 2330 Raymond Ave., Ramona, Calif. 92065

[21] Appl. No.: 563,774

[22] Filed: Nov. 28, 1995

Related U.S. Application Data

[63] Continuation of Ser. No. 355,555, Dec. 14, 1994, Pat. No. 5,469,882.
[51] Int. Cl.⁶ .................................................. F16L 5/00
[52] U.S. Cl. ............................................ 137/360; 137/315
[58] Field of Search ................................... 137/360, 315, 137/357; 251/143

[56] References Cited

U.S. PATENT DOCUMENTS

| | | | |
|---|---|---|---|
| 1,108,823 | 8/1914 | Van Ness | 137/360 |
| 3,148,698 | 9/1964 | Arnold | 137/360 |
| 4,158,471 | 6/1979 | Lagsdon | 137/360 |
| 5,050,362 | 9/1991 | Meons, Jr. | 137/360 |
| 5,423,345 | 6/1995 | Condon et al. | 137/360 |

*Primary Examiner*—A. Michael Chambers
*Attorney, Agent, or Firm*—Baker, Maxham, Jester & Meador

[57] ABSTRACT

A generally planar mounting plate is formed to slidingly receive at least one mounting strap for supporting the plate between two adjacent wall studs. A mounting dish overlies a first side of the mounting plate. A valve, such as an angle stop valve or a gate valve, is secured to the mounting plate and mounting dish utilizing a cylindrical hollow adapter and a nut. The adapter has a female threaded forward end which is screwed over the male threaded shank of the valve. The adapter has a male threaded rearward end that extends through a hole in the base of the dish and a hole in an intermediate region of the mounting plate. A nut is screwed over the rearward end of the adapter to squeeze the mounting dish and the mounting plate between a shoulder of the adapter and the nut. A detachable outer cover is provided for frictionally engaging an internal wall of the dish for enclosing and protecting the valve during installation and finishing of the surrounding drywall. A detachable ring-shaped escutcheon slides into the dish once the cover has been removed.

18 Claims, 4 Drawing Sheets

PARTIALLY RECESSED VALVE FIXTURE FOR CONNECTION TO FAUCETS AND COMMODES

CROSS-REFERENCE TO RELATED PATENT

This application is a continuation of prior application Ser. No. 08/355,555, filed Dec. 14, 1994, which issued as U.S. Pat. No. 5,469,882 on Nov. 28, 1995.

BACKGROUND OF THE INVENTION

The present invention relates to plumbing fixture supplies and pertains particularly to a supply that incorporates a shut-off valve for simpler and more consistent installation and pressure testing of water supply pipes and subsequent connection to faucets and commodes.

Local governing bodies typically mandate building codes, such as the Uniform Plumbing Code (UPC), that incorporate very specific regulations regarding plumbing installations. Such regulations set forth in detail the manner in which faucets, commodes and other fixtures must be connected to water supply lines.

Water supply connections are commonly provided to certain plumbing fixtures, such as faucets and commodes. The water supply pipe typically runs between studs behind the wall in a wooden or sheet metal frame building structure. Either a T or a ninety-degree elbow is used to provide a connection to a nipple or stub-out line that extends outward through the wall. A small shut-off valve commonly called an angle stop valve is installed on the end of the nipple or stub-out line. A flex line is connected between the shut-off valve and the plumbing fixture.

These angle stop valve installations are roughed in during construction by running the hot and cold water supply lines through or between the studs to the appropriate connection locations. A HOLDRITE (trademark) strap may be attached between wooden studs. Stub-out lines are mounted through holes in such a strap and connected to the water lines. The stub-out lines extend outward beyond the expected wall surfaces and are capped. In some cases the water supply lines terminate in conical sealed nipples. The plumber then waits until the finish work is done, including wall board plastering, painting and the like, before he or she returns to complete the connections to the faucets or toilet. The plumber must be sure to have a bucket available to catch the water, flux and other debris which may be in the pipes when they are opened, otherwise hardwood floors and carpets can be damaged. The plumber must scrape paint and plaster form the outer surface of the lines, and cut them to the proper length to install the angle stop valves. The plumber must then fit and tighten a compression nut over the threaded shank of the angle stop valve onto the Copper pipe. Care must be taken not to over or under tighten the nut, such as to cause leaks. The plumber then installs a flex line to the faucet or toilet.

FIG. 1A illustrates a typical prior art plumbing installation in a bathroom before drywall has been nailed over the studs and a sink and its supporting cabinet are installed. Hot and cold water supply lines 10 and 12 extend vertically between studs 14 and 16 and are connected by ninety-degree elbows 18 and 20 to horizontally extending hot and cold stub-out lines 22 and 24. The water supply lines 10 and 12 and the stub-out lines 22 and 24 are typically made of Copper or polybutylene. The stub-out lines 22 and 24 are supported by a metal HOLDRITE strap 26 nailed to the studs 14 and 16. The stub-out lines 22 and 24 terminate in sealed conical nipples 28 and 30. An ABS drain pipe 32 also extends vertically between the studs 14 and 16 and is connected to the lower coupling of an ABS T-shaped fitting 34. The drain pipe 32 extends to the main sewer line in the house. An ABS vent pipe 36 is connected to the upper coupling of the T-shaped fitting 34 and extends through the roof. An ABS trap arm 38 is connected to the center coupling of the T-shaped fitting 34 and extends horizontally away from the studs 14 and 16. The plumber must estimate where the sink will be installed and locate the stub-out lines 22 and 24 and the trap arm 38 accordingly.

The drywall (not shown) has holes cut in the same so that the stub-out lines 22 and 24 and the trap arm 38 can be inserted therethrough before the drywall is nailed to the studs. The local building inspector typically requires pressure testing of the water lines and drain/waste/vent system before approval is given. Therefore the stub-out lines 22 and 24 are sealed at their outer ends either via nipples 28 and 30 or caps (not shown). A mechanical test plug (not shown) is inserted into the upstream end of the trap arm 38. This must be done throughout the house at each similar plumbing installation.

The installation of angle stop valves after drywall has been installed is very problematic. After the lines have been cut water drains even if the pressure has been turned off. The water is dirty with flux and other residue which stains the floor or bathroom cabinets. If a leak is found in the water supply system, the water supply lines 10 and 12 must be drained if they are Copper to permit re-soldering of the leaking joint. This requires the seals on the stub-out lines 22 and 24 to be removed and then re-installed for a second pressure test. Once the water supply passes inspection, and after drywall has been installed, the nipples 28 and 30 on the ends of the stub-out lines 22 and 24 are removed and angle stop valves are connected.

FIG. 1B shows a typical angle stop valve 40. The angle stop valve comprises a T-shaped valve body 42 having a threaded shank 44. A compression nut 46 is tightened over the shank 44 to compress a ferrule (not shown) around the outer end of the stub-out line 22. A circular generally convex chrome plate 48 surrounds the stub-out line 22 and overlies the wall to provide a more attractive finish. The inner end of a flex line 50 is inserted through another ferrule (not shown) and into a threaded sleeve 52 of the valve body 42. Another compression nut 54 screws over the sleeve 52. A round knob 56 may be rotated to turn the valve 40 ON and OFF.

U.S. Pat. No. 5,050,632 of Means, Jr. discloses a prefabricated metal box with a surrounding flange for recessed installation into drywall. The flange is nailed to a stud. The box encloses an angle stop valve which is connected to a vertically extending water supply line mounted behind the drywall. The angle stop valve may be coupled to a conventional flex line for connecting the same to a plumbing fixture such as a faucet or toilet tank. An escutcheon fits into the outer end of the box to provide an aesthetically pleasing finish to the drywall cutout. While the angle stop box of the aforementioned Means, Jr. patent has significant advantages, its primary disadvantage lies in its cost of fabrication. Also, the box is so compact that it is difficult to manually turn the valve ON or OFF or to replace the valve.

SUMMARY OF THE INVENTION

It is therefore the primary object of the present invention to provide a valve fixture which may be initially installed between wall studs and will be fully ready for connecting a water supply line when the dry wall finish work is completed.

The present invention provides valve fixture which comprises a generally planar mounting plate formed to slidingly receive at least one mounting strap for supporting the plate between two adjacent wall studs. A mounting dish overlies a first side of the mounting plate. A valve, such as an angle stop valve, a gate valve, or a hose bib is secured to the mounting plate and mounting dish utilizing a cylindrical hollow adapter and a nut. The adapter has a female threaded forward end which is screwed over the male threaded shank of the valve. The adapter has a male threaded rearward end that extends through a hole in the base of the dish and a hole in an intermediate region of the mounting plate. A nut is screwed over the rearward end of the adapter to squeeze the mounting dish and the mounting plate between a shoulder of the adapter and the nut. A detachable outer cover is provided for frictionally engaging an internal wall of the dish for enclosing and protecting the valve during installation and finishing of the surrounding drywall.

DESCRIPTION OF THE PREFERRED EMBODIMENTS

Figure 1A:
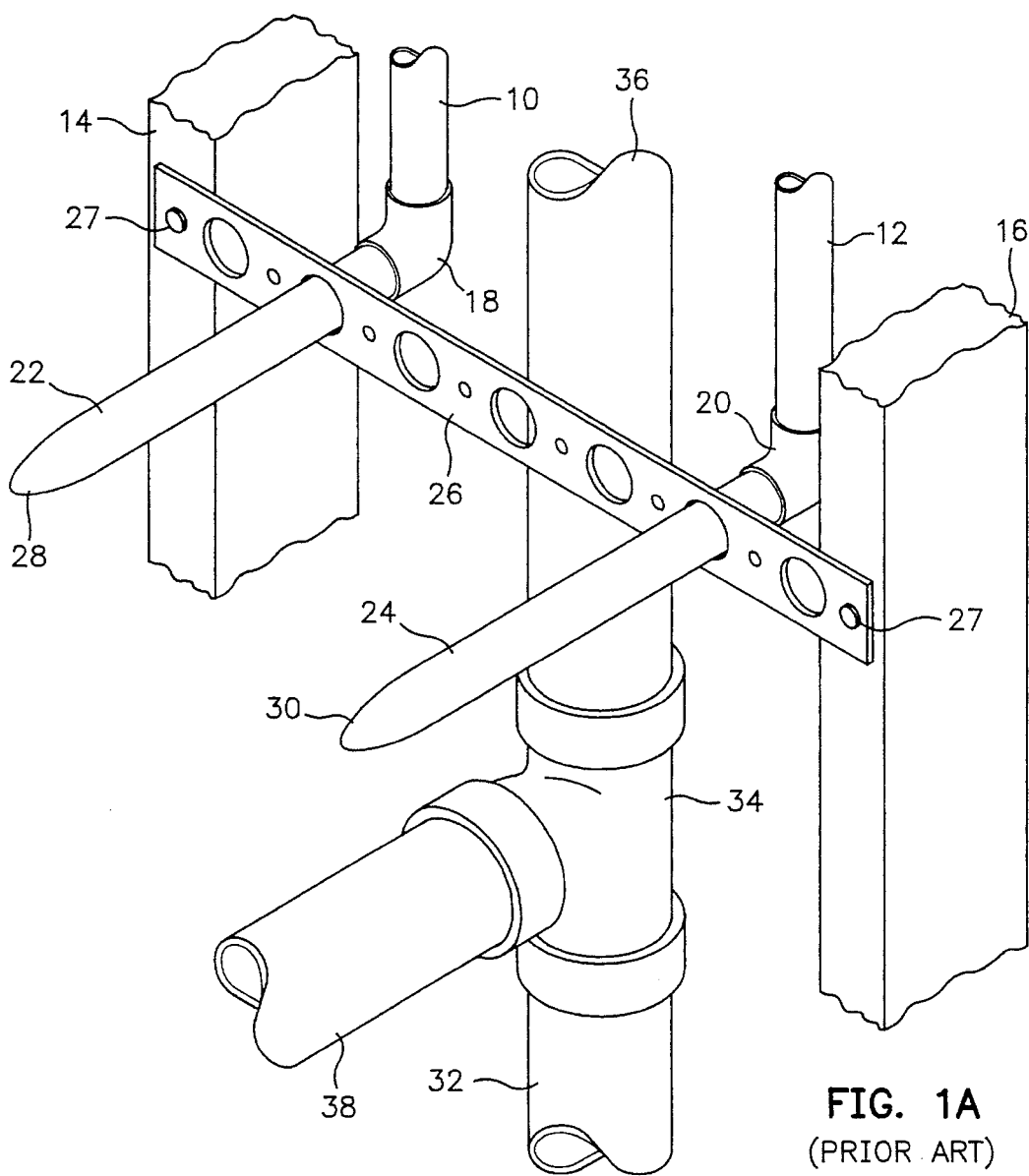
FIG. 1A is a perspective view illustrating a conventional prior art installation of hot and cold water stub-out lines which extend through holes in a mounting strap nailed between adjacent wall studs.
Figure 1B:
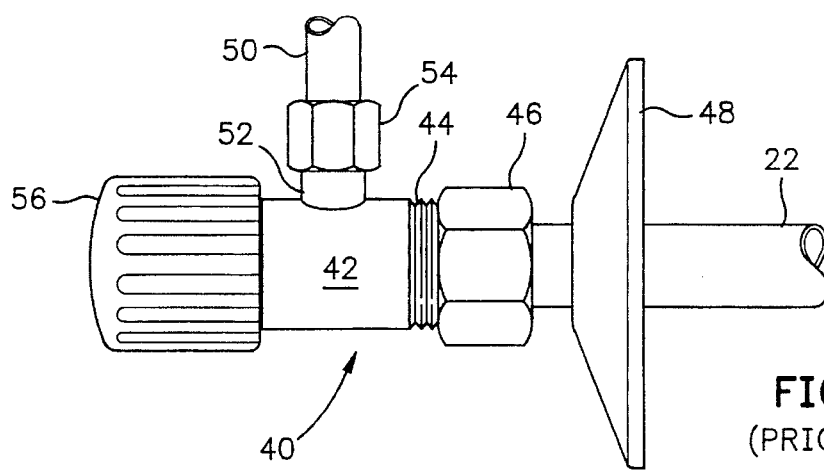
FIG. 1B is an enlarged side elevation view illustrating a conventional prior art angle stop valve connected between a stub-out line and a flex line that goes to a faucet or commode.
Figure 2:
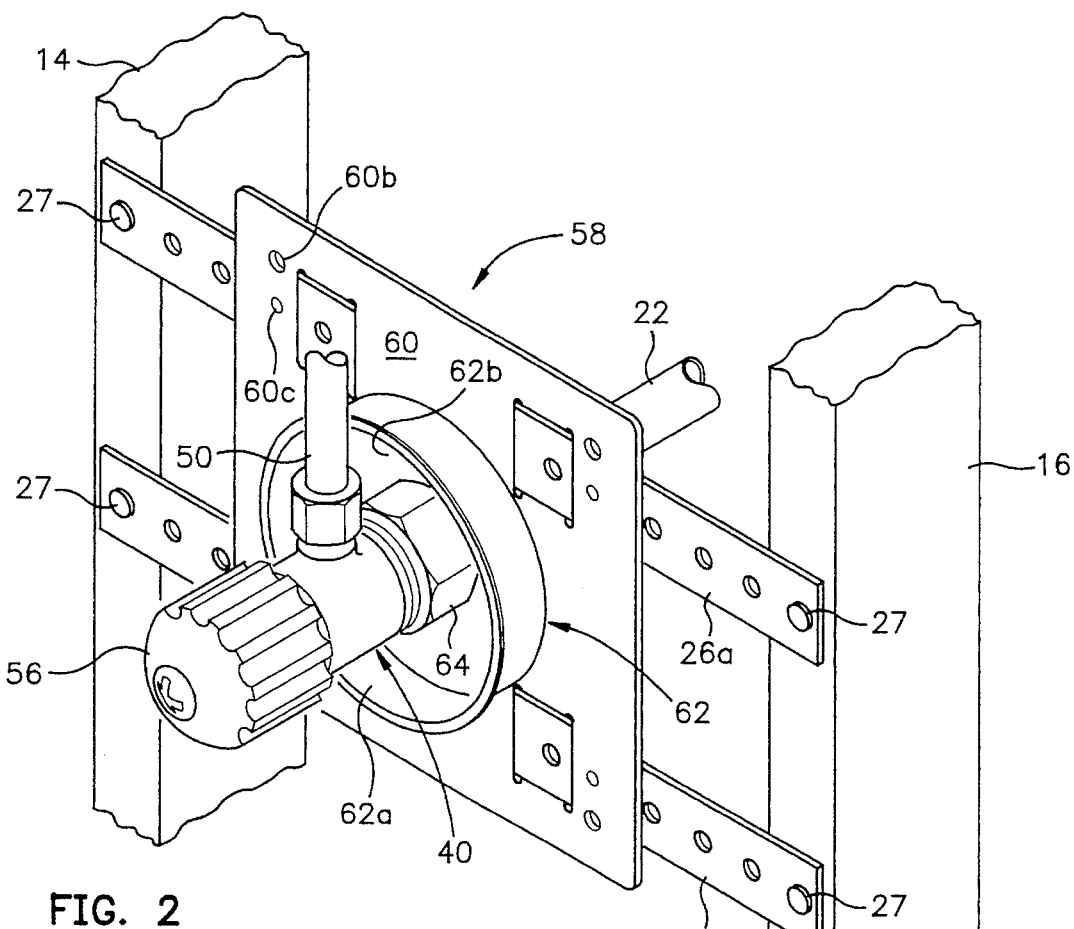
FIG. 2 is a perspective view illustrating the installation of a partially recessed valve fixture in accordance with the present invention.

Referring to FIG. 2, a valve fixture 58 is secured to the adjacent vertical wall studs 14 and 16 by upper and lower mounting straps 26a and 26b whose terminal ends are secured to the studs by nails 27. The valve fixture 58 comprises a generally planar mounting plate 60, a mounting dish 62 which overlies a front side of the mounting plate, a valve such as an angle stop valve 40, and a cylindrical adapter 64 which connects the valve 40 to the stub-out line 22.

Figure 3:
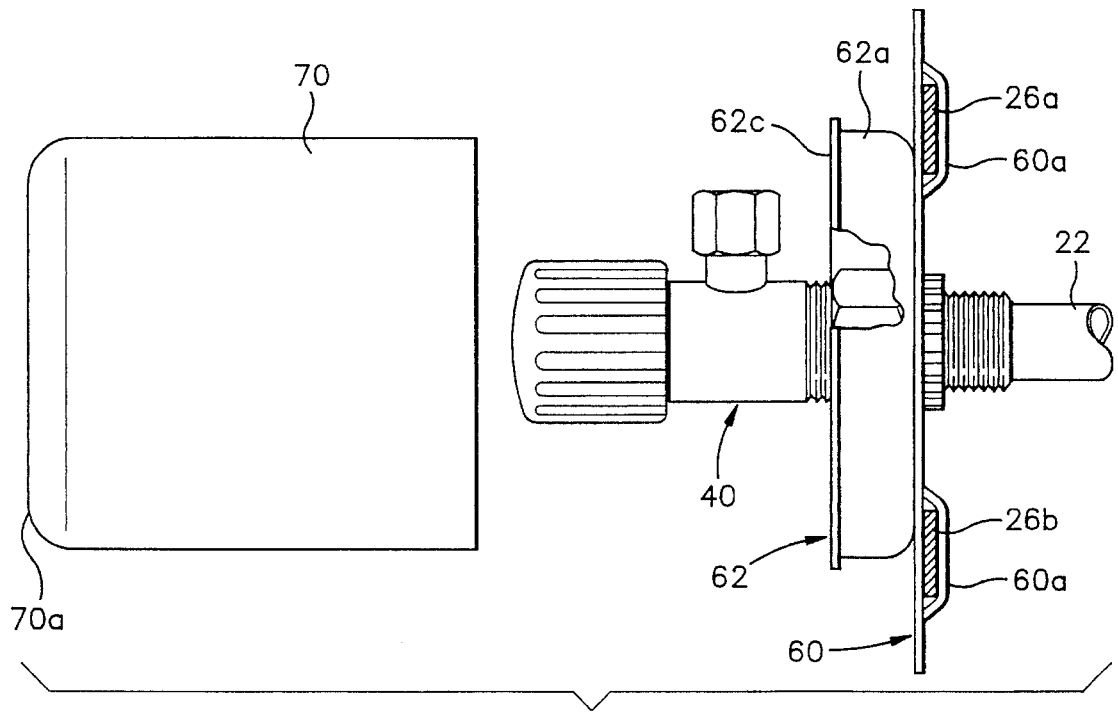
FIG. 3 is a side elevation of the bracket, dish and angle stop valve of the fixture of FIG. 2 with the protective cylindrical cover in position for insertion into the dish to shield the valve. A portion of the dish is broken away to show the forward end of the adapter that connects the angle stop valve to the dish.

The mounting plate 60 (FIG. 2) is preferably rectangular in shape and has an generally planar configuration. Four pairs of equally spaced slots are formed in the periphery of the plate 60 adjacent each corner. These slots slidingly receive HYCO (Trademark) mounting straps 26a and 26b so that they extend generally co-planar with the mounting plate 60. The slots are inexpensively formed by die-stamping the plate 60 to form brackets 60a (FIG. 3). The mounting plate 60 is also formed with large and small holes 60b and 60c (FIG. 2) through which nails or screws (not shown) may be inserted to secure the left or right side of the mounting plate 60 directly over the edge of either the wall stud 14 or the wall stud 16 in lieu of utilizing the mounting straps 26a and 26b. Alternatively, screws may be inserted into the holes 60c to secure the plate to the straps 26a and 26b. The brackets 60a also form stops to engage the edge of the stud to align the bracket when it is nailed to a stud. A single mounting strap can also be used.

The mounting plate 60 (FIG. 2) may be advantageously formed from galvanized sheet metal. The plate 60 does not touch the Copper stub-out line 22. This eliminates damage from galvanic action that might otherwise occur if there were contact between the plate 60 and the Copper stub-out line 22.

The mounting dish 62 (FIG. 2) preferably has a cylindrical configuration including an annular wall 62a and a circular base 62b. The mounting dish 62 further includes a flange 62c (FIG. 3) which extends radially from the forward or outer end of the annular wall 62a. The distance between the flange 62c and the mounting plate 60 is preferably slightly greater three-quarters of an inch to accommodate the thickness of standard drywall or gypsum board.

The mounting plate 60 and dish 62 are separate pieces for ease of fabrication. This also allows the dish to be finished differently, e.g. a different color. The fixture is also fireproof.

Figure 5:
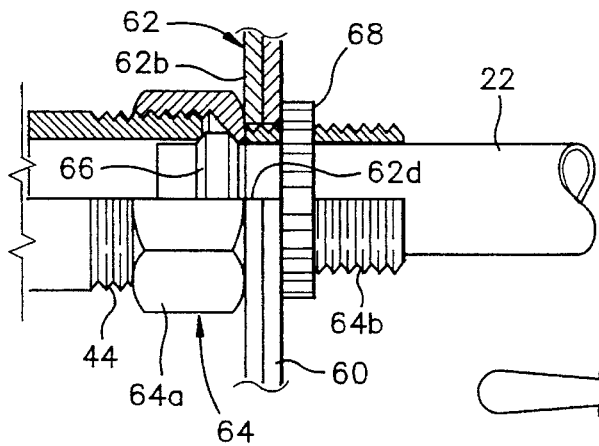
FIG. 5 is an enlarged part sectional, part elevational view illustrating the connection between the sleeve of the angle stop valve and the stub-out line of the installation of FIG. 2.

Details of the adapter 64 and the manner in which it connects the angle stop valve 40 and the stub-outline 22 are illustrated in FIG. 5. The adapter 64 is cylindrical and hollow and has an internal bore sized to slidingly receive therethrough the Copper, CPVC or polybutylene stub-outline 22. The adapter 64 has an enlarged female threaded forward end 64a which screws over the male threaded hexagonal shank 44 of the angle stop valve 40. The adapter 64 also has a relatively smaller male threaded rearward end 64b that extends through a central hole 62d (FIG. 5) in the circular base 62b (FIG. 2) of the dish 62 and an aligned hole 60d in the middle of the plate 60. The forward end 64a (FIG. 5) of the adapter 64 has an inner tapered wall which squeezes and compresses a ferrule 66 around the forward end of the stub-outline 22 to provide a water-tight connection with the male threaded shank 44 of the angle stop valve 40 (FIG. 2). A nut 68 (FIG. 5) is screwed over the rearward end 64b of the adapter 64 to squeeze the dish base 62b and the mounting plate 60 between a tapered outer shoulder of the forward end 64a of the adapter and the nut 68. This provides a secure and stable mechanical connection between the angle stop valve 40 and the mounting plate 60. It also provides a stable rigid mechanical connection between the adapter 64, the angle stop valve 40 (FIG. 2) and the stub-outline 22 (FIG. 5).

A detachable, hollow plastic cylindrical outer cover 70 (FIG. 3) is sized for frictionally engaging an internal surface of the annular wall 62a of the mounting dish 62. The cover 70 has a substantially closed outer or forward end 70a. The cover 70 preferably has a vent hole (not shown) to release pressure generated by soldering. The cover is factory installed over the fixture 58 before the fixture is secured to the wall studs 14 and 16 in order to protect the angle stop valve 40 during the subsequent installation of drywall and finishing of the same. This shields the valve 40 from mechanical blows and also protects the valve 40 from plaster and/or paint dripping onto the same. It also keeps the dish clean for subsequent installation of a ring-shaped escutcheon of the type hereafter described.

Figure 4:
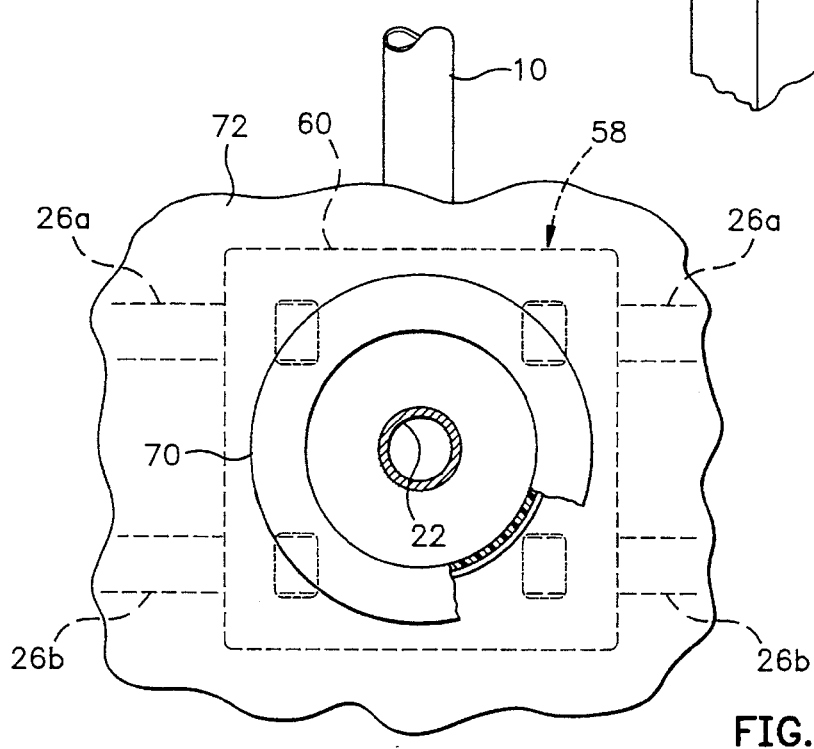
FIG. 4 is a partial front elevation view of the installation of FIG. 2 showing the bracket of my invention in phantom lines behind a fragmentary section of drywall.

FIG. 4 illustrates a fragmentary section 72 of drywall installed over the wall studs 14 and 16 and the valve fixture 58. A round hole is cut in the drywall section 72 in order to permit the mounting dish 62 (FIG. 3) to extend through the drywall. When my valve fixture is installed, the angle stop valve 40 is normally turned OFF to permit immediate pressurization of the water supply lines. Once the flex line 50 has been connected to the angle stop valve and the faucet or commode, the angle stop valve 40 may be turned ON by rotating the knob 56 in a counter-clockwise direction, by way of reference to FIG. 2.

Figure 6:
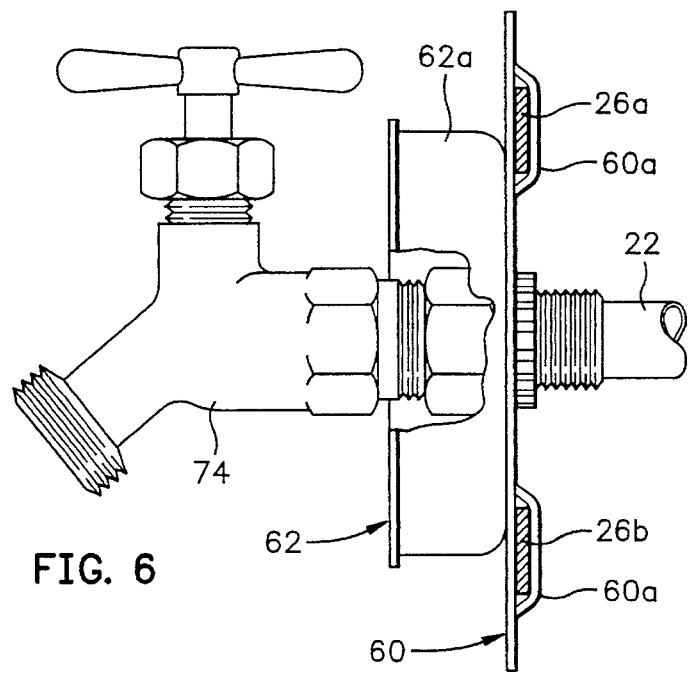
FIG. 6 is a side elevation view of a first alternate embodiment of my invention that incorporates a boiler drain valve or hose bib instead of an angle stop valve.

FIG. 6 illustrates a first alternate embodiment of my valve fixture which is similar to the embodiment just described, except that a hose bib 74 has been substituted for the angle stop valve 40. In addition, the mounting dish 62 has a longer annular wall 62d to accommodate the thickness of an exterior stucco wall of a residential building.

Figure 7:
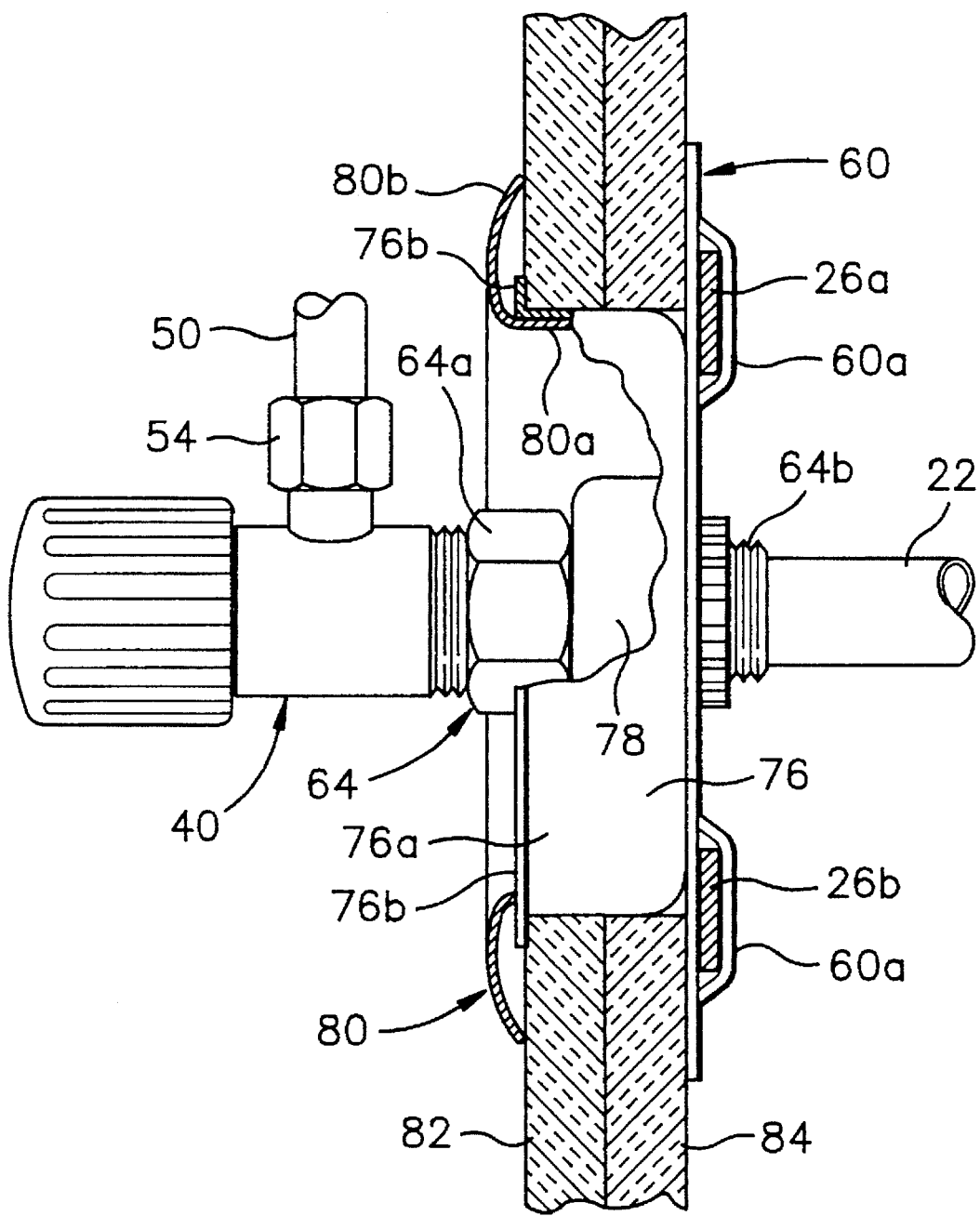
FIG. 7 is a side elevation view of a second alternate embodiment of my invention with portions broken away to show how its modified dish and mating escutcheon accommodates mounting through a double layer of drywall.

FIG. 7 is a side elevation view of a second alternate embodiment of my valve fixture which is similar to the embodiment of FIGS. 2–4, except that a modified mounting dish 76 has been substituted for the mounting dish 62. The mounting dish 76 has a deeper annular wall 76a and is formed with a central mounting hub 78. The modified dish 76 has a flange 76b similar to flange 62c. The mounting hub 78 has a hole formed in the center thereof which receives the male threaded rearward end 64b of the adapter 64. The forward hexagonal end 64a of the adapter abuts the outer end of the hub 78. A ring shaped escutcheon 80 has a cylindrical portion 80a which conformably fits within the annular wall 76a of the modified mounting dish 78. The escutcheon 80 has a curved, radially extending rim portion 80b which overlies the portions of the drywall defining the hole through which the dish 76 is mounted. The depth of the dish 76 permits the escutcheon 80 to telescope inwardly and outwardly to accommodate double, or single thicknesses of drywall, or stucco walls. In FIG. 7, two separate layers of drywall 82 and 84 are shown in overlapped relationship. The hub 78 of the modified mounting dish 76 positions the angle stop valve 40 sufficiently outside the mounting dish and the escutcheon 80 to permit the flex line 50 from the faucet or commode to connect to the valve via the compression nut 54 and still clear the dish and the escutcheon.

While I have described two embodiments of my valve fixture, and in particular, a partially recessed angle stop valve installation, it will be understood by those skilled in the art that my invention may be modified in both arrangement and detail. For example, the mounting plate 60 need not be rectangular. The mounting dish 62 need not be cylindrical. Therefore, the protection afforded my invention should only be limited in accordance with the scope of the following claims.

I claim:

1. A valve fixture for connecting a stub-out line to a faucet or commode, comprising:

a mounting plate including means for enabling securement to a stud, the mounting plate having hole in an intermediate region thereof;

an angle stop valve having a male threaded shank extending through the hole in the mounting plate;

a mounting dish overlying a first side of the mounting plate, the mounting dish having a base with a hole through which the shank of the angle stop valve extends, the mounting dish having a peripheral wall spaced from and surrounding the angle stop valve, and the mounting dish being configured to be received in a cut-out region in a layer of drywall overlying the stud;

means for securing the shank of the angle stop valve to the mounting dish and mounting plate; and means for coupling the shank of the angle stop valve to a stub-out line.

2. A valve fixture according to claim 1 wherein the dish has a cylindrical configuration.

3. A valve fixture according to claim 1 and further comprising an escutcheon configured to mate with the peripheral wall of the mounting dish and overlie the drywall.

4. A valve fixture according to claim 1 wherein the base of the mounting dish is formed with a mounting hub having the hole formed therein for receiving the shank of the angle stop valve.

5. A valve fixture according to claim 1 wherein the means for securement of the mounting plate is a plurality of holes for each receiving a mounting fastener selected from the group consisting of a nail and a screw.

6. A valve fixture according to claim 1 wherein the means for securement of the mounting plate is a plurality of slots for receiving therethrough a mounting strap.

7. A valve fixture according to claim 1 wherein the means for coupling the shank of the angle stop valve to a stub-out line includes a ferrule surrounding a forward end of the stub-out line, and a cylindrical adaptor having a forward end with female threads screwed over the male threaded shank of the angle stop valve to compress the ferrule and a rearward male threaded end that extends through the holes in the mounting plate and the mounting dish.

8. A valve fixture according to claim 7 wherein the means for securing the shank of the angle stop valve to the mounting dish and mounting plate includes a nut screwed over the rearward end of the adaptor to squeeze the base of the mounting dish and the mounting plate between an outer shoulder of the forward end of the adaptor and the nut.

9. A valve fixture, comprising:

a generally planar mounting plate;

a mounting dish overlying a first side of the mounting plate;

a valve having a threaded shank;

a hollow cylindrical adapter having a female threaded forward end screwed over the shank of the valve and a male threaded rearward end that extends through a hole in a base of the dish and a hole in an intermediate region of the mounting plate; and a nut screwed over the rearward end of the adapter to squeeze the base of the dish and the mounting plate between an outer shoulder of the forward end of the adapter and the nut.

10. A valve fixture according to claim 9 and further comprising:

a detachable outer cover for frictionally engaging an internal wall of the dish for enclosing and protecting the valve.

11. A valve fixture according to claim 9 wherein the valve is an angle stop valve.

12. A valve fixture according to claim 9 wherein the valve is a hose bib.

13. A valve fixture according to claim 9 wherein the mounting plate is formed with at least two pairs of spaced apart slots for slidingly receiving the strap.

14. A valve fixture according to claim 9 wherein the mounting plate has a plurality of holes forms in a periphery thereof for receiving nails to secure the mounting plate directly to a wall stud or to the mounting strap.

15. A valve fixture according to claim 9 wherein the mounting plate is stamped from a single piece of metal to provide spaced pairs of slots for slidingly receiving the strap so that it extends co-planar with the mounting plate.

16. A valve fixture according to claim 9 wherein the mounting plate is formed with slots for slidingly receiving upper or lower straps.

17. A valve fixture according to claim 9 wherein the adapter has an internal bore sized to slidingly receive a stub-out line therethrough which is coupled to the shank of the valve.

18. A valve fixture according to claim 9 wherein the dish has an annular internal wall, a circular base and a central raised hub with a hole for receiving the threaded rearward end of the cylindrical adapter.

* * * * *